United States Patent
Palefsky-Smith

(10) Patent No.: US 10,061,322 B1
(45) Date of Patent: Aug. 28, 2018

(54) SYSTEMS AND METHODS FOR DETERMINING THE LIGHTING STATE OF A VEHICLE

(71) Applicant: GM GLOBAL TECHNOLOGY OPERATIONS LLC, Detroit, MI (US)

(72) Inventor: Raphael Palefsky-Smith, Santa Cruz, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 15/480,624

(22) Filed: Apr. 6, 2017

(51) Int. Cl.
| | |
|---|---|
| *G05D 1/00* | (2006.01) |
| *G05D 1/02* | (2006.01) |
| *G06K 9/00* | (2006.01) |
| *G06T 11/60* | (2006.01) |
| *G06N 3/08* | (2006.01) |
| *G06N 3/04* | (2006.01) |

(52) U.S. Cl.
CPC ......... *G05D 1/0212* (2013.01); *G05D 1/0088* (2013.01); *G06K 9/00791* (2013.01); *G06N 3/04* (2013.01); *G06N 3/08* (2013.01); *G06T 11/60* (2013.01); *G06T 2210/22* (2013.01)

(58) Field of Classification Search
CPC .... G05D 1/0088; G06K 9/00791; G06N 3/04; G06N 3/08; G06T 11/60; G06T 2210/22
See application file for complete search history.

(56) References Cited

U.S. PATENT DOCUMENTS

| | | | | |
|---|---|---|---|---|
| 9,150,220 | B2 * | 10/2015 | Clarke | B60W 30/00 |
| 9,443,153 | B1 * | 9/2016 | Gupta | G06F 17/3028 |
| 9,830,704 | B1 * | 11/2017 | Mishra | G06T 7/004 |
| 9,904,859 | B2 * | 2/2018 | Grauer | G06K 9/00805 |
| 2010/0098297 | A1 * | 4/2010 | Zhang | B60W 30/09 382/104 |
| 2010/0198488 | A1 * | 8/2010 | Groitzsch | G01C 21/26 701/117 |
| 2014/0279760 | A1 * | 9/2014 | Aliferis | G06N 99/005 706/12 |
| 2016/0148115 | A1 * | 5/2016 | Sirosh | G06N 99/005 706/11 |
| 2017/0174129 | A1 * | 6/2017 | Chin | B60R 1/00 |
| 2017/0213149 | A1 * | 7/2017 | Micks | B60W 30/09 |
| 2017/0236027 | A1 * | 8/2017 | van der Made | G06K 9/4628 382/158 |
| 2018/0025317 | A1 * | 1/2018 | Dominguez | G06Q 30/018 |

* cited by examiner

*Primary Examiner* — Calvin Cheung
(74) *Attorney, Agent, or Firm* — Lorenz & Kopf, LLP

(57) ABSTRACT

Systems and method are provided for controlling a vehicle. In one embodiment, a vehicle lighting detection method includes receiving sensor data associated with operation of one or more vehicles, and extracting from the sensor data a plurality of images and a plurality of corresponding image labels, wherein the images each include at least a portion of an observed vehicle, and the image labels indicate the corresponding lighting state of the observed vehicle in each of the images. The method further includes training, with a processor, a machine learning model utilizing the plurality of images and the plurality of corresponding image labels.

20 Claims, 7 Drawing Sheets

SYSTEMS AND METHODS FOR DETERMINING THE LIGHTING STATE OF A VEHICLE

TECHNICAL FIELD

The present disclosure generally relates to autonomous vehicles, and more particularly relates to systems and methods for determining the lighting state of a vehicle in the vicinity of the autonomous vehicle, for example, whether or not the brake lights and/or turn signals of the vehicle are illuminated.

BACKGROUND

An autonomous vehicle (AV) is a vehicle that is capable of sensing its environment and navigating with little or no user input. It does so by employing sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in AVs, such systems might still be improved in a number of respects. For example, it would be advantageous for an AV to be capable of determining whether the brake lights, turn signals, hazard lights and/or other exterior lamps of another vehicle in the environment are illuminated. This information would assist the AV in predicting the likely behavior of other vehicles. While machine learning models might be considered for this task, training such a model would be time-consuming—requiring significant human intervention in the form of acquiring a large number of training images (e.g., of other vehicles) and labeling those images with the appropriate "lighting state" (e.g., "brake lights on," "left turn signal on," etc.).

Accordingly, it is desirable to provide systems and methods that are capable of training, without the aforementioned human intervention, an AV to recognize the exterior lighting state of other vehicles in the environment. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling an autonomous vehicle. In one embodiment, a vehicle lighting detection method includes receiving sensor data associated with operation of one or more vehicles, and extracting from the sensor data a plurality of images and a plurality of corresponding image labels, wherein the images each include at least a portion of an observed vehicle, and the image labels indicate the corresponding lighting state of the observed vehicle in each of the images. The method further includes training, with a processor, a machine learning model utilizing the plurality of images and the plurality of corresponding image labels.

In one embodiment, a system for controlling a vehicle includes an image extraction module and a vehicle lighting detection module. The image extraction module is configured to: accept sensor data associated with operation of one or more vehicles; extract from the sensor data a plurality of images and a plurality of corresponding image labels, wherein the images each include at least a portion of an observed vehicle, and the image labels indicate the corresponding lighting state of the observed vehicle in each of the images; and train a machine learning model utilizing the plurality of images and the plurality of corresponding image labels. The vehicle lighting detection module, which includes the trained machine learning model, is configured to receive sensor data relating to an environment associated with the autonomous vehicle and determine the vehicle lighting state of a second vehicle in the environment.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, autonomous vehicles, machine learning, image analysis, neural networks, vehicle lighting, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
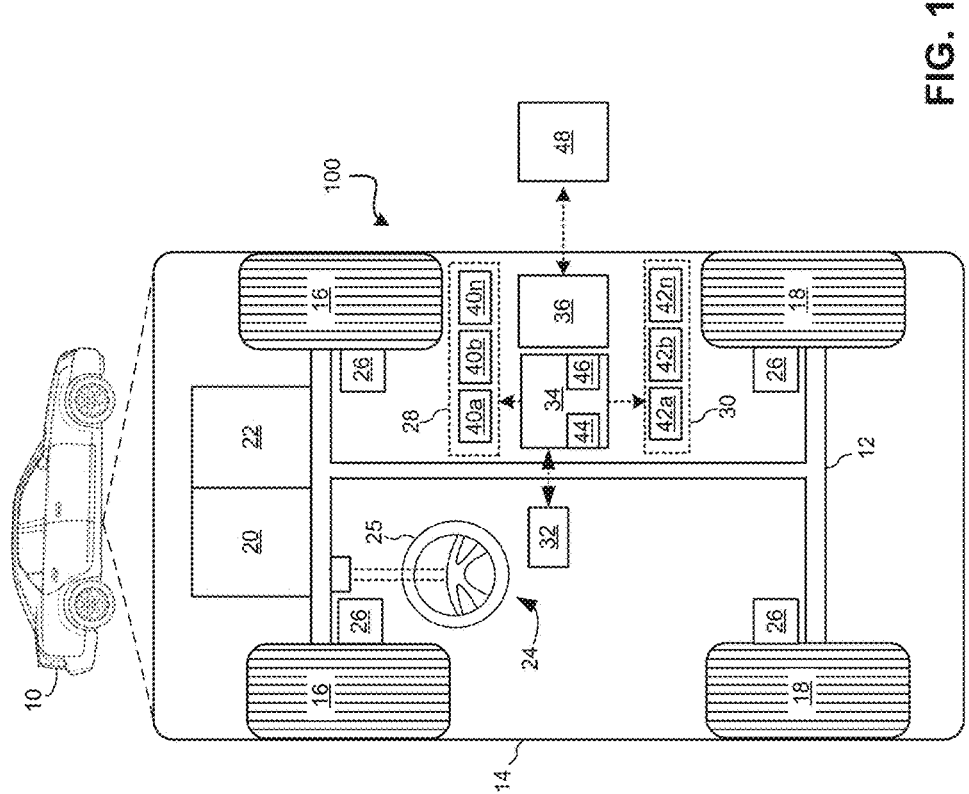
FIG. 1 is a functional block diagram illustrating an autonomous vehicle including a system in accordance with various embodiments.

With reference to FIG. 1, a vehicle lighting detection system (or simply "system") 100 is associated with an autonomous vehicle (AV) 10 in accordance with various embodiments. In general, vehicle lighting detection system 100 includes a machine learning (ML) model (e.g., a convolutional neural network) capable of determining the lighting state of other vehicles in the vicinity of vehicle 10, wherein the ML model itself is trained (e.g., by a central server external to AV 10) using sensor data previously acquired by one or more vehicles and subjected to an automatic extraction and labeling process to produce labeled training images (e.g., a set of individual vehicle images, produced by an optical camera, along with a lighting state label for each of those images). The resulting ML model can then be distributed to any number of vehicles, and may be automatically updated at regular or configurable intervals.

Stated another way, system and methods in accordance with the present subject matter are capable of automatically extracting and labeling training images from contemporaneous sensor data and thereafter training the ANN without human involvement. This extraction and labeling is accomplished using information acquired from sensor data (such as lidar and map data) contemporaneously, which is used by the system to reason about the behavior and state of the vehicle that was previously observed (i.e., the "observed vehicle"). This process might take into account evidence relating to, for example, the state of the world (e.g., illumination of a traffic light), the state of the observed vehicle relative to the world (e.g., vehicle decelerating rapidly, vehicle in a turn-only lane, vehicle approaching an intersection), and the future behavior of the observed vehicle (e.g., a determination that the vehicle actually made a turn or stopped at Referring now to FIG. 1, an autonomous vehicle ("AV" or simply "vehicle") 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, vehicle 10 is an autonomous vehicle and vehicle lighting detection system 100 is incorporated into the autonomous vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems and methods in accordance with the present embodiment may be used in conjunction with any autonomous vehicle that utilizes a navigation system to provide route guidance.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* might include, but are not limited to, radars, lidars, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to detect the lighting state of other vehicles in the environment using a model that has been previously trained by extracting and labeling training images from contemporaneous sensor data.

Figure 2:
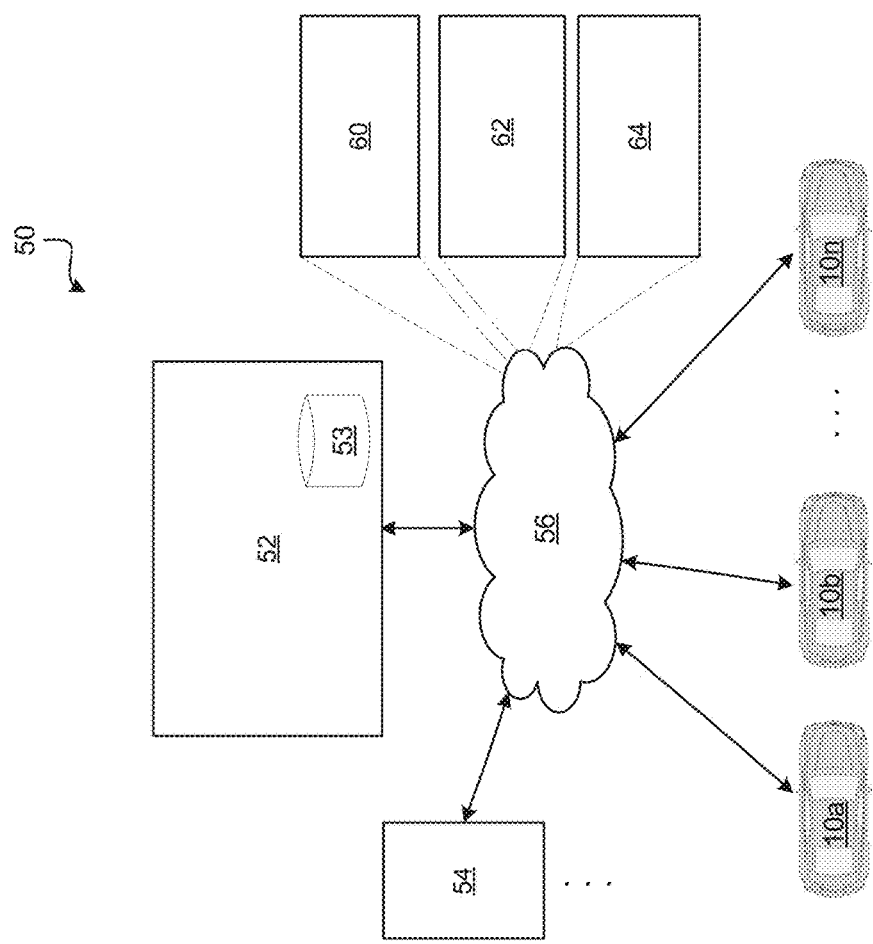
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10*a*-10*n* as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
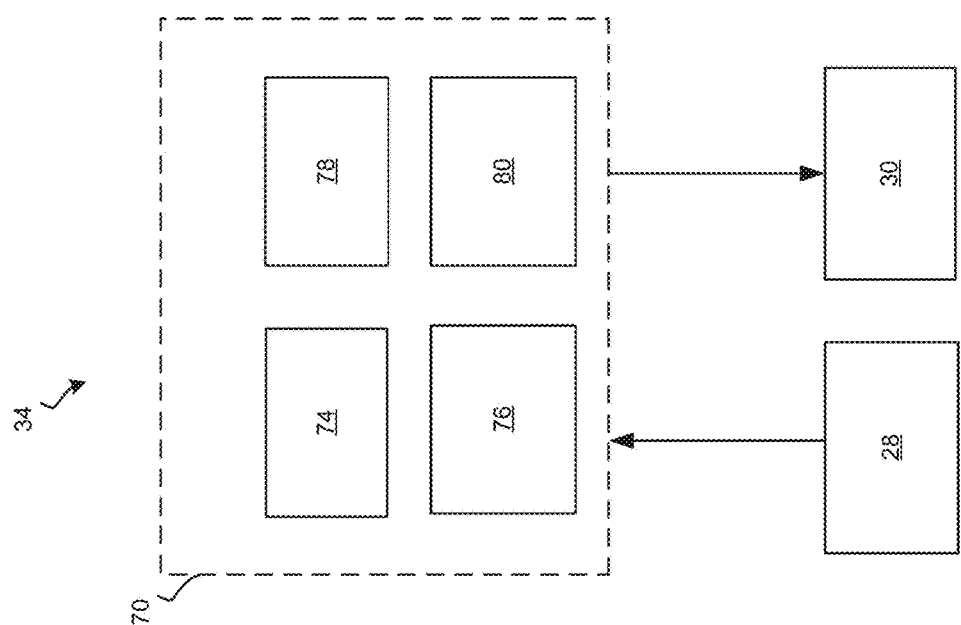
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the system 100 of FIG. 1 is configured to determine the lighting state of other vehicles in the environment utilizing a machine learning model that has been trained by automatically extracting and labeling training images from sensor data previously acquired from any number of vehicles.

Figure 4:
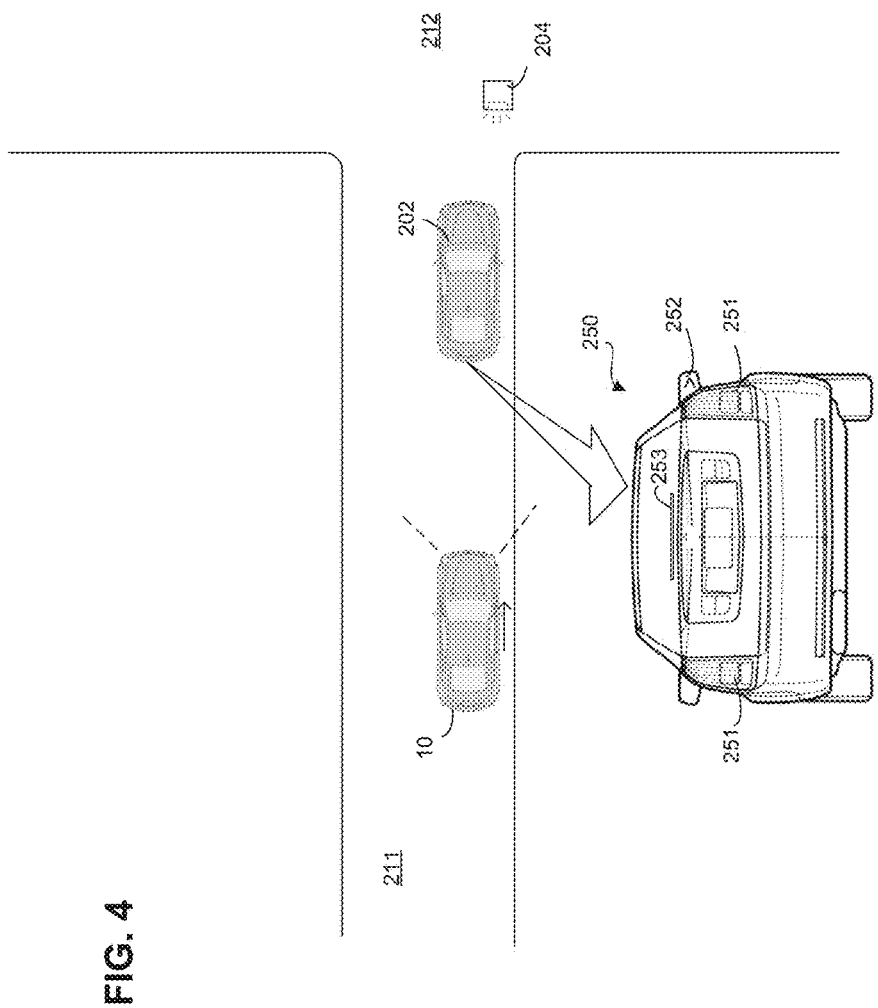
FIG. 4 is a conceptual overview of an autonomous vehicle and roadway helpful in describing various embodiments.

In that regard, FIG. 4 is a simplified, conceptual overview of an autonomous vehicle and roadway helpful in describing operation of various embodiments. In FIG. 4, AV 10 is shown traveling (to the right) along a roadway 211 toward an intersection 212. Also shown in this figure is a traffic light 204 and a second vehicle 202 located in front of vehicle 10 along roadway 211. The inset image shows a view of the rear portion 250 of vehicle 202, including various external lighting components that might be observed by the various sensors of AV 10, such as brake lamps/turn signal/hazard lamps 251, turn signal lamps 252, and upper brake lamp 253. It will be appreciated that the example vehicle 202 and rear lighting configuration shown in FIG. 4 are not intended to be limiting, and that systems and methods in accordance with the present subject matter are capable of detecting and categorizing the lighting state of any type of vehicle now known or later developed.

As used herein, the term "lighting state" refers to the state (e.g., illuminated, not illuminated, partially illuminated) of various lighting components provided on vehicles external to AV 10 and the meaning of their activation or lack of activation. As is known in the art, vehicle lighting may be categorized as either illumination lighting (e.g., headlamps, driving lamps, fog lamps, high beams, and the like) or "conspicuity" lighting. The latter category may include front conspicuity lighting (daytime running lights), lateral conspicuity lighting (side turn signals, etc.), and rear conspicuity lighting (reverse indicator, tail lights, brake lights, center high mount stop lamps, emergency stop signals, etc.). Depending upon the design of vehicle 202, any given lamp may be used for multiple purposes. For example, the brake lamps (251) might also be used as hazard lamps, turn signals, or the like, depending upon the context. Accordingly, the "lighting state" is intended to encompass the meaning of the detected illumination of the vehicle. Such lighting states may include, for example, "hazard lights on/off", "brake lights on/off", "turn signals off/onLeft/onRight", and the like. The lighting state may be represented in any convenient way using a variety of known data structures.

As mentioned briefly above, and as further described below, system and methods in accordance with the present subject matter are capable of automatically extracting and labeling training images from contemporaneous sensor data produced by any number of vehicles (such as AV 10, vehicle 202, etc.) and thereafter training a neural network without human involvement. This extraction and labeling is accomplished take into account evidence relating to, for example, the state of the world (i.e., the state of the environment in the vicinity of the vehicle), the state of the observed vehicle relative to the world (i.e., the state of the vehicle relative to the environment in which it is traveling), and the future behavior of the observed vehicle (i.e., the behavior of the vehicle later observed). FIG. 4 thus shows the real-time acquisition of sensor data (by AV 10) that will later be used for extraction and labeling of training data. In that regard, the phrase "observed vehicle" refers to a vehicle whose behavior (as determined by sensor data) is later used to train a machine learning model, as described in further detail below.

In FIG. 4, the state of the world might include, for example, the state of traffic light 204 (e.g., green, yellow, red), which both AV 10 and vehicle 202 are approaching. That is, if the sensor data indicates that traffic light 204 is red (i.e., a "stop" state), then the system might consider this extra "evidence" (when later performing the labeling procedure) that the optical view of rear 250 of vehicle 202 includes illumination of brake lamps 251. Such extra evidence might also include, for example, the presence of crosswalks, pedestrians within a crosswalk, and any other visible light or other signal that might be relevant.

The state of the vehicle relative to the world might include, for example, an assessment that vehicle 202 is decelerating rapidly (suggesting that brake lights 251 are activated). The state of the vehicle relative to the world might also include the nature of the lane in which vehicle 202 is traveling (using map data). For example, if it is determined that vehicle 202 is in a right-turn only lane, then this might be considered extra evidence that the right turn signal 252 of vehicle 202 is illuminated. The state of the vehicle relative to the world might also include an indication that vehicle 202 is approaching intersection 212 (as determined from map data), and is thus likely more to be traveling with its brake lights 251 activated. The state of the vehicle might also include an indication that vehicle 202 is approaching a top sign, a yield sign, a particular type of intersection, or other relevant signage.

In some embodiments, the system confirms that the observed vehicle is traveling in the same direction as AV 10 (e.g., to prevent the system from considering automotive headlights). This might involve, for example, filtering out decelerating cars traveling the opposite direction in an opposite lane. That is, the system would consider not only decelerating cars, but decelerating cars that will have their brake lights visible to AV 10. Similarly, the system might also filter observations based on the presence of other cars in between AV 10 and the observed vehicle—i.e., determining that the correct vehicle is being observed.

With respect to the future behavior of the vehicle, this might include, for example, a determination that vehicle 202 actually stopped at intersection, which provides extra evidence that the brake lights 251 were previously illuminated. Similarly, the fact that vehicle 202 actually takes a right turn at intersection 212 is further evidence that its right turn signal 252 was previously illuminated. The system might also take into account the fact that a car with its hazards activated is not likely to move in the near term.

In accordance with various embodiment, the term "future behavior" refers to an implementation in which the system examines the output of both a tracker and a map component available to AV 10 (as may be incorporated into the system of FIG. 3). As mentioned above, a tracker is a component that tracks the position (and other data) of objects over time. More particularly, in one embodiment the system queries the tracker as to where a particular observed vehicle ended up after some predetermined time (e.g., about 10 seconds). The tracker then responds with positional information (e.g., longitude/latitude). The system queries the map component to determine the street, etc., corresponding to that location. The nature of the movement to that street, etc. can then be interpreted as a turn (e.g., right turn, left turn, straight, etc.).

In some embodiments, the fact that many drivers do not properly use turn signals, etc., might also be taken into account—i.e., there is "noise" in the observed data. If this noise is sufficiently low, the ML model may select to tolerate the error. If the noise is above some predetermined threshold, however, a human operator may be employed to assist in interpretation (i.e., labeling training images). In one embodiment, for example, when presented with an already cropped and likely correctly-labeled image, the operator merely indicates whether the label is correct.

Figure 5:
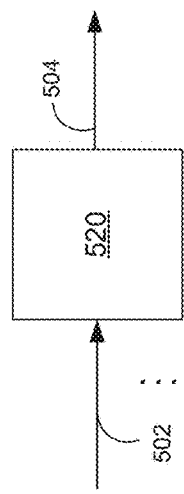
FIG. 5 is a dataflow diagram illustrating a vehicle lighting detection system in accordance with various embodiments.

FIG. 5 is a dataflow diagram that illustrates various embodiments of the system 100 which may be embedded within the controller 34. Referring to FIG. 5, an exemplary system generally includes a vehicle lighting detection module 520 that receives sensor data 502 relating to the vehicle's environment (e.g., camera images, lidar data, or any other sensor data received from sensor system 28) and has, as its output 503, a determination as to the lighting state of a vehicle within its field of view (such as vehicle 202 in FIG. 4). Thus, module 520 implements the ML model that has been previously trained using a variety of sensor data acquired through the normal everyday driving of one or more vehicles, as described in further detail below.

As a threshold matter, it will be understood that various embodiments of the system 100 according to the present disclosure can include any number of sub-modules embedded within the controller 34. As can be appreciated, the sub-modules shown in FIG. 5 can be combined and/or further partitioned to similarly perform the various methods described herein. Inputs to the system 100 may be received from the sensor system 28, received from other control modules (not shown) associated with the autonomous vehicle 10, received from the communication system 36, and/or determined/modeled by other sub-modules (not shown) within the controller 34 of FIG. 1.

As mentioned briefly above, the vehicle lighting detection module may implement a variety of machine learning methodologies, such as an image-centric artificial neural network that undergoes training using a set of images previously acquired and stored (e.g., in server 53 of FIG. 2). In that regard, FIG. 6 is a block diagram of an exemplary convolutional neural network (CNN) in accordance with various embodiments.

Figure 6:
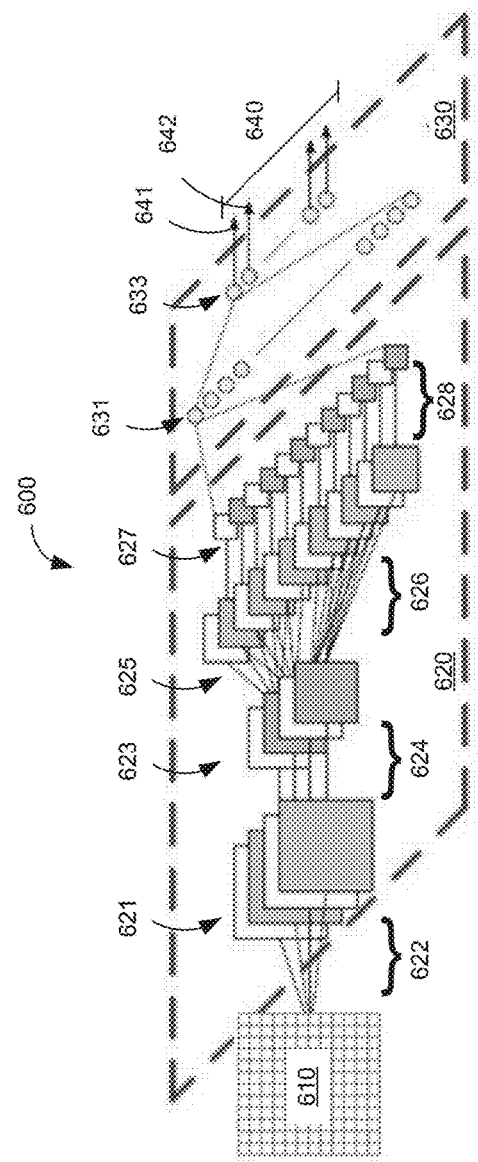
FIG. 6 is a conceptual block diagram of an artificial neural network (ANN) in accordance with various embodiments.

As shown in FIG. 6, an exemplary CNN 600 generally receives one or more input images 600 (e.g., labeled optical images of an observed vehicle, as described further below) and produces a series of outputs 640 associated with lighting state of observed vehicles recognized within the image. In that regard, input 610 may be referred to without loss of generality as an "image," even though it might include other sensor data types.

In general, CNN 600 implements a convolutional phase 622, followed by feature extraction 620 and classification 630. Convolutional phase 622 uses an appropriately sized convolutional filter that produces a set of feature maps 621 corresponding to smaller tilings of input image 610. As is known, convolution as a process is translationally invariant—i.e., features of interest (brake lamps, side mirror lights, etc.) can be identified regardless of their location within image 610.

Subsampling 624 is then performed to produce a set of smaller feature maps 623 that are effectively "smoothed" to reduce sensitivity of the convolutional filters to noise and other variations. Subsampling might involve taking an average or a maximum value over a sample of the inputs 621. Feature maps 623 then undergo another convolution 628, as is known in the art, to produce a large set of smaller feature maps 625. Feature maps 625 are then subsampled to produce feature maps 627.

During the classification phase (630), the feature maps 627 are processed to produce a first layer 631, followed by a fully-connected layer 633, from which outputs 640 are produced. For example, during normal operation of AV 10 (i.e., after installation of the trained ML model) output 641 might correspond to "hazard lamps on", output 642 might correspond to "left turn signal on", etc. In some embodiments, outputs 640 are probabilistic—i.e., the output is a vector representing the probability that corresponding lighting states are "true", for example:

[probability_brake_lights_on,
probability_left_turn_signal_on,
probability_right_turn_signal_on,
probability_hazard_lights_on])=[0.92, 0.14, 0.13, 0.30]

In general, the CNN 600 illustrated in FIG. 6 has been trained by presenting it with a large number (i.e., a "corpus") of input images and providing the known, predetermined labels to outputs 840 based on the determined lighting state(s). Backpropagation as is known in the art is then used to refine the training of CNN 600. The resulting model is then implemented within module 520 of FIG. 5. Subsequently, during normal operation of AV 10, the trained CNN 600 is used to process images 610 received as AV 10 travels and observes other vehicles in its environment.

It will be appreciated that the present embodiments are not limited to the CNN model described above. A variety of machine learning techniques may be used, including, for example, other artificial neural networks, such as recurrent neural networks (RNN), as well as random forest classifiers, Bayes classifiers (e.g., naive Bayes), principal component analysis (PCA), support vector machines, linear discriminant analysis, long short-term memory (LSTM) models, and the like. In some embodiments, multiple ANNs can be employed—i.e., one ANN may be used to detect turn signal activity, and another might be used to detect brake light activity.

Figure 8:
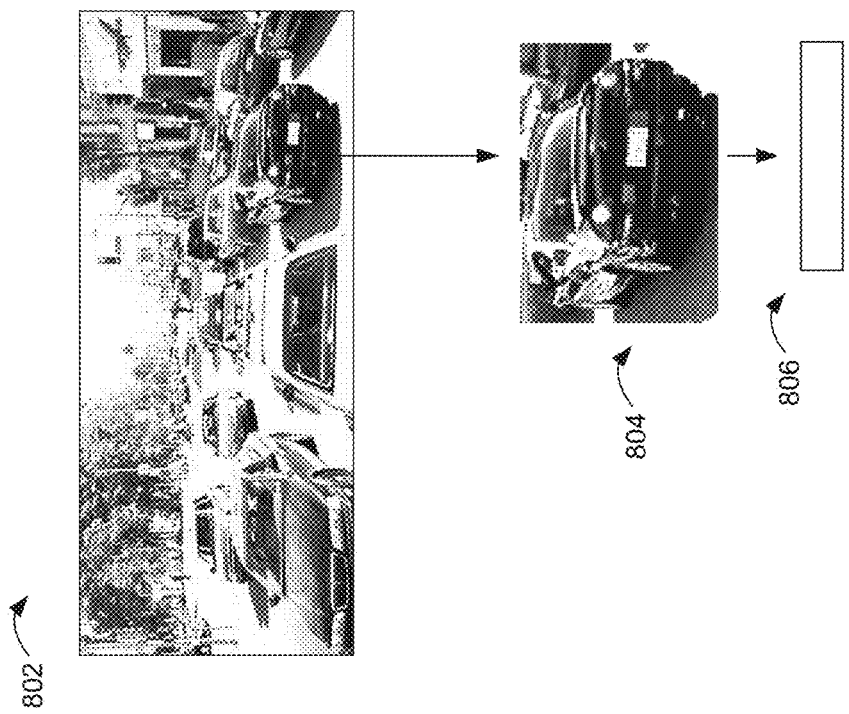
FIG. 8 illustrates and example labeled images to be used for training an ANN such as that shown in FIG. 6.
Figure 7:
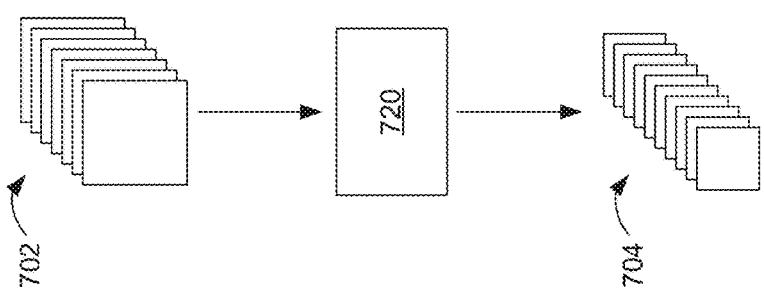
FIG. 7 is a dataflow diagram illustrating operation of an image extraction and label generation module in accordance with various embodiments.

FIG. 7 is a dataflow diagram illustrating operation of an image extraction and label generation module 720 in accordance with various embodiments. In general, module 720 takes as its input sensor data 702 (from one or more of the sensors within sensor system 28), and produces an output 74 that comprises labeled images 704. That is, output 74 includes a set of images of what it has determined are individual observed vehicles (extracted from any number of vehicles within a particular scene), along with a corresponding label (e.g., "brake_lights_on," "right_turn_signal_on", or the like), which can then be used to train CNN 600. Referring to FIG. 8, for example, a large scale optical image 802 (representing, perhaps, the front view from AV 10) may be processed by module 720 (using other available sensor data, such as lidar cloud information) to extract a smaller image 804 of an individual observed vehicle and to provide it with an appropriate label (in this case "brake_lights_on"). This image would later be supplied as the input Referring now to FIG. 9, and with continued reference to FIGS. 1-8, a flowchart illustrates a control method 900 that can be performed by the system 100 of FIG. 1 in conjunction with the module 720 of FIG. 7. As can be appreciated in light of the disclosure, the order of operation within the method is not limited to the sequential execution as illustrated in FIG. 9, but may be performed in one or more varying orders as applicable and in accordance with the present disclosure.

Figure 9:
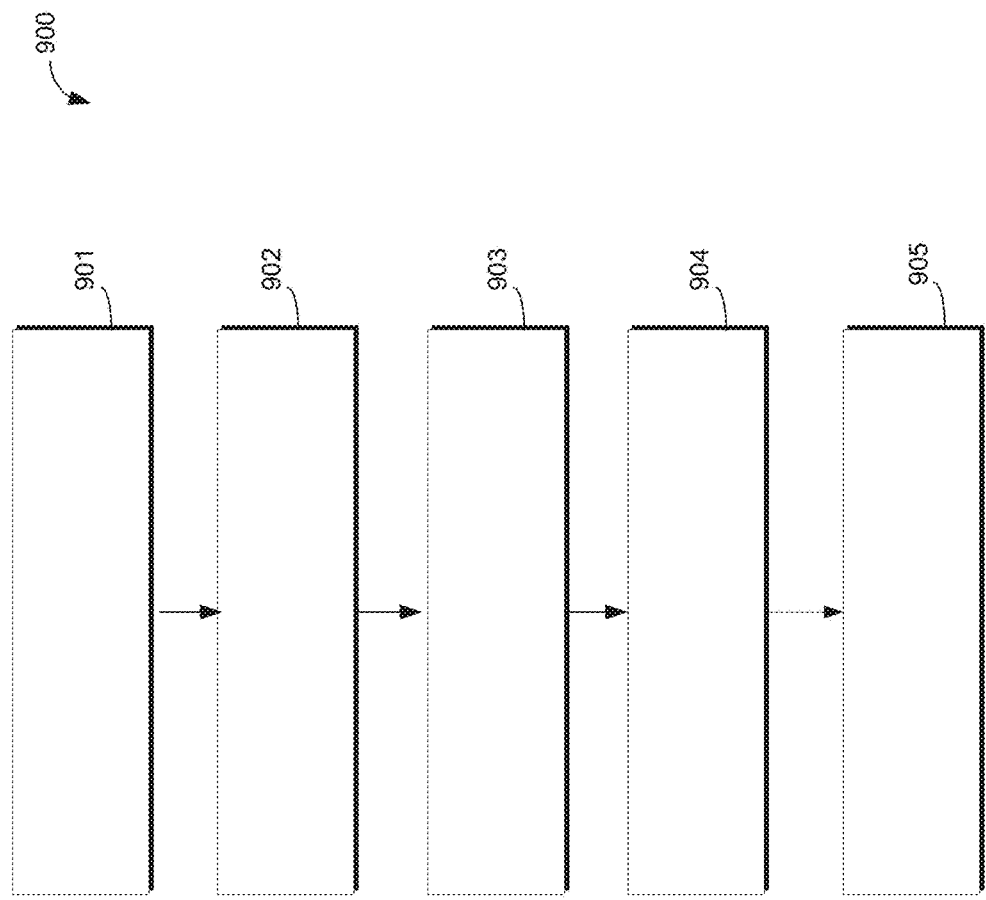
FIG. 9 is a flowchart illustrating a control method for training an ANN such as that shown in FIG. 6 and utilizing that ANN in connection with an autonomous vehicle that includes the vehicle lighting detection module of FIG. 5.

With continued reference to FIG. 9, the process begins at 901 with the acquisition of sensor data. As mentioned above, sensor data might include any available data acquired by sensor system 28 during operation of AV 10 and/or other vehicles that are used to populate the database (e.g., database 53) to be used for training CNN 600. That is, a corpus of sensor data may be populated by a fleet of vehicles configured to transmit their saved sensor data to an external server for later processing.

Next, at 902, module 720 is used to extract and label images to create a training set based on the sensor data 702 acquired at 901. The result will be a large number of labeled images (704) with corresponding labels (corresponding to discrete vehicle lighting states). Module 720 may be implemented, for example, within remote transportation system 52 of FIG. 2. This step generally includes analyzing all available sensor data, cropping a large optical image of a scene so that it encompasses only one vehicle (or as close as possible to one vehicle), then determining the most likely vehicle lighting state of the vehicle that is the subject of the cropped image. The size of the crop may be determined, for example, by examining the lidar point cloud size corresponding to the observed vehicle. The vehicle lighting state may be determined, as noted above, based on the state of the world, the state of the vehicle relative to the world, and the future behavior of the vehicle.

In one embodiment, the extraction process is implemented as a series of progressive "filtering" steps. For example, the system might first scan over the entire dataset or some subset of the dataset chosen by some heuristic or manual decision. This scan might be performed using a batch or streaming processing framework such as MapReduce or Spark, which are known in the art. The system might not need to examine every single vehicle if the database is indexed. For instance, the database might store the maximum deceleration of a vehicle. In that case, the system might just ask the database for cars with a certain minimum deceleration, and avoid the cost of observing irrelevant cars. Next, the system performs a series of successive filtering steps. At each step, the system reduces the number of vehicles considered by applying some form of predetermined test.

For example, to locate cars with their brake lights on, the system might: (a) filter to keep only those vehicles that are rapidly decelerating; (b) filter to keep only those rapidly-decelerating cars that are traveling in the same direction as AV 10 and have no camera-blocking cars in between it and AV 10; (c) filter to keep only those cars from (b) that are stopping at a red light, and so on with additional progressive filters, if appropriate.

During such progressive filtering, the system might also collect what are called "negative examples." That is, the ANN is preferably trained with examples of both cars with their lights on and those with lights off, so it can learn to tell the difference between the two. The filtering steps provide an opportunity to collect these negative examples as well.

The labeled images 704 produced by module 720 in step 802 are then used to train the ANN (e.g. CNN 600 of FIG. 6) as described above. That is, each of the labeled images are presented to CNN 600 as an input image (610), with the outputs (640) being set to the correct vehicle lighting state label associated with each image.

Once the ANN has been trained, the model is then provided (e.g., via communication network 56) to one or more vehicles (e.g., AV 10), as shown in step 904. This model can then be used in the ordinary course to detect the lighting state of other vehicles in the vicinity of AV 10, thereby providing AV 10 with another tool to predict the behavior of those vehicles.

Both the training of ML model 520 and the subsequent use of that model to detect lighting states may be accomplished through the use of a sequence of images or other sensor input acquired at known time intervals. In such cases, ML model 520 may advantageously implement a time-based recurrent neural network (RNN), such as a long short-term memory (LSTM) model. The observation of a sequence of images (rather than a single frame or snapshot) can be useful in a number of scenarios. For example, an image sequence may be used to detect flashing turn indicators, which experience a change in illumination over time. Similarly, an image sequence may be used to detect the activation of a brake signal, particularly at night, when the primary indication of braking is an increase in tail lamp intensity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle lighting detection method comprising:
receiving sensor data associated with operation of one or more vehicles;
extracting from the sensor data a plurality of images and a plurality of corresponding image labels, wherein the images each include at least a portion of an observed vehicle, and the image labels indicate a corresponding lighting state of the observed vehicle in each of the images;
training, with a processor, a machine learning model utilizing the plurality of images and the plurality of corresponding image labels.

2. The method of claim 1, further including transmitting the trained machine learning model to an autonomous vehicle over a communication network.

3. The method of claim 1, wherein the lighting states characterize the state of one or more conspicuity lights associated with the observed vehicle.

4. The method of claim 1, wherein the plurality of images includes a sequence of images of the observed vehicle acquired at predetermined time intervals.

5. The method of claim 1, wherein extracting the plurality of images from the sensor data includes cropping an optical image to include the portion of the vehicle based on the sensor data.

6. The method of claim 1, wherein extracting the plurality of corresponding image labels is based on at least one of the state of the environment in the vicinity of the observed vehicle, the state of the observed vehicle relative to the environment, and a future behavior of the observed vehicle.

7. The method of claim 6, wherein the state of the environment in the vicinity of the observed vehicle includes at least the state of a traffic light being approached by the observed vehicle.

8. The method of claim 6, wherein the state of the observed vehicle relative to the environment includes at least a velocity of the observed vehicle, an acceleration of the observed vehicle, a type of the lane in which the observed vehicle is traveling, whether the observed vehicle is approaching an intersection, and whether the observed vehicle is approaching a light or signage that is likely to affect the motion of the vehicle.

9. The method of claim 6, wherein the future behavior of the observed vehicle includes at least whether the observed vehicle turned and whether the observed vehicle stopped.

10. The method of claim 1, wherein the machine learning model is an artificial neural network model.

11. The method of claim 10, wherein the artificial neural network model is a convolutional neural network model.

12. A system for controlling an autonomous vehicle, comprising:
  an image extraction module configured to:
    accept sensor data associated with operation of one or more vehicles;
    extract from the sensor data a plurality of images and a plurality of corresponding image labels, wherein the images each include at least a portion of an observed vehicle, and the image labels indicate the corresponding lighting state of the observed vehicle in each of the images; and
    train a machine learning model utilizing the plurality of images and the plurality of corresponding image labels; and
  a vehicle lighting detection module, including the trained machine learning model, configured to receive sensor data relating to an environment associated with the autonomous vehicle and determine the vehicle lighting state of a second vehicle in the environment.

13. The system of claim 12, wherein the machine learning model is a convolutional neural network model.

14. The system of claim 12, wherein the lighting states characterize the state of one or more conspicuity lights associated with the vehicle.

15. The system of claim 14, wherein the conspicuity lights include at least one of brake lights, hazard lights, and turn-signal lights.

16. The system of claim 14, wherein extracting the plurality of corresponding image labels is based on at least one of the state of the environment in the vicinity of the observed vehicle, the state of the observed vehicle relative to the environment, and the future behavior of the observed vehicle.

17. An autonomous vehicle, comprising:
  at least one sensor that provides sensor data; and
  a controller that, by a processor and based on the sensor data:
    receives, over a network, an artificial neural network model trained utilizing a plurality of images and a plurality of corresponding image labels, wherein the images each include at least a portion of an observed vehicle, and the image labels indicate the corresponding lighting state of the observed vehicle in each of the images; and
    determine, using the trained artificial neural network model, the vehicle lighting state of a second vehicle in the environment.

18. The autonomous vehicle of claim 17, wherein the lighting states characterize the state of one or more conspicuity lights associated with the observed vehicle.

19. The autonomous vehicle of claim 17, wherein the conspicuity lights include at least one of brake lights, hazard lights, and turn-signal lights.

20. The autonomous vehicle of claim 17, wherein extracting the plurality of corresponding image labels is based on at least one of the state of the environment in the vicinity of the observed vehicle, the state of the observed vehicle relative to the environment, and the future behavior of the observed vehicle.

* * * * *